Oct. 14, 1952     LE ROY S. JESSEN     2,613,921
AERIAL PICKUP AND RELEASE DEVICE
Filed Oct. 10, 1950
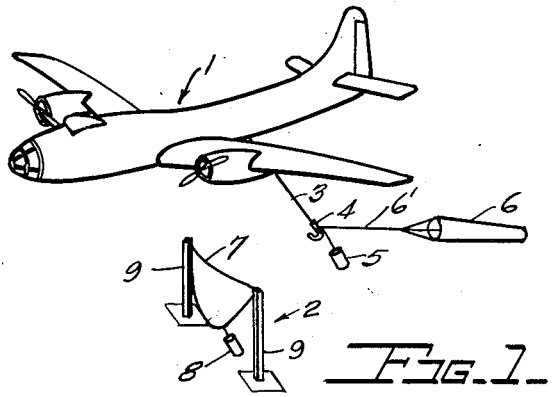
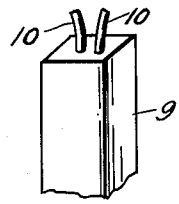
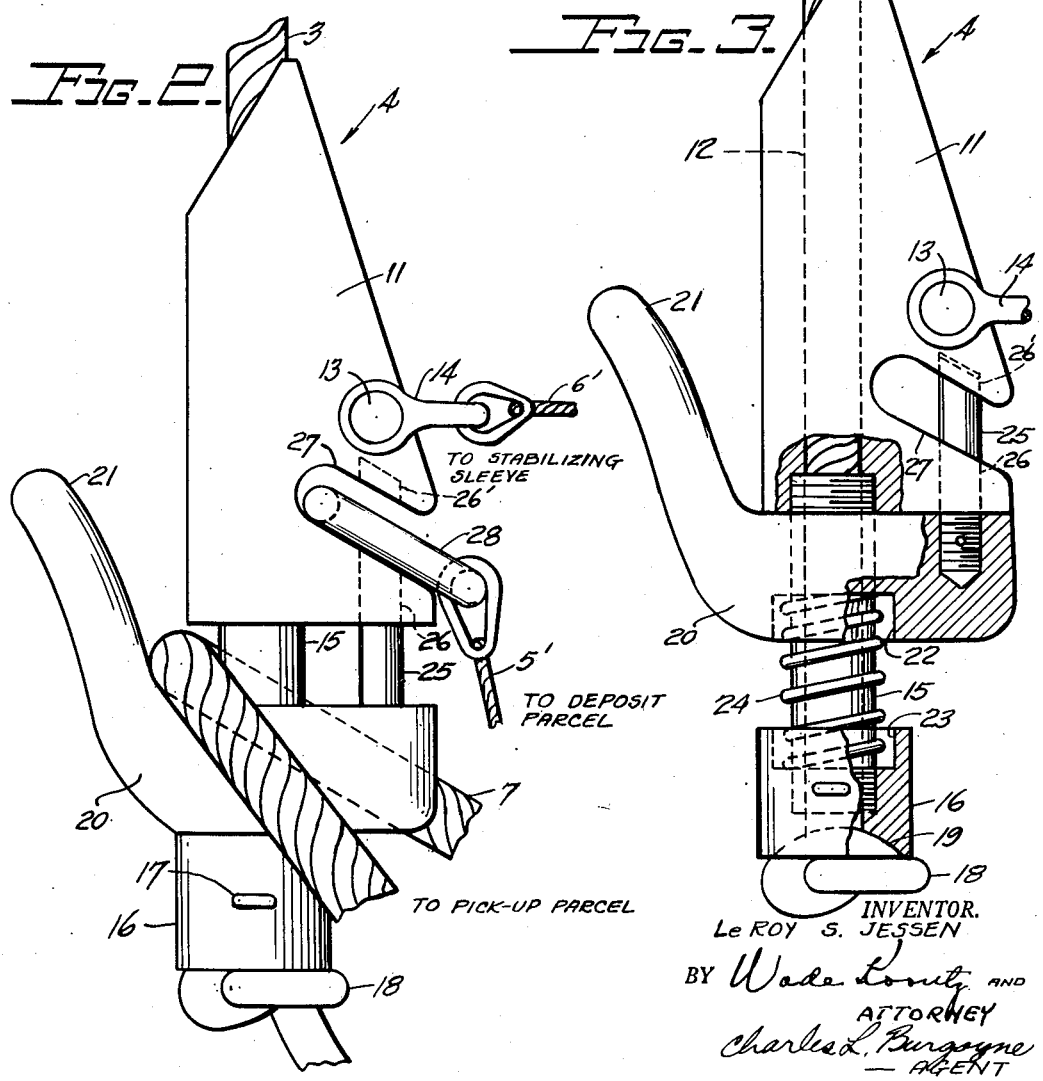
INVENTOR.
Le ROY S. JESSEN Patented Oct. 14, 1952

2,613,921

UNITED STATES PATENT OFFICE 2,613,921

AERIAL PICKUP AND RELEASE DEVICE

Le Roy S. Jessen, Fairborn, Ohio

Application October 10, 1950, Serial No. 189,462

2 Claims. (Cl. 258—1.8)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an aerial pick-up and release device for suspension from an aircraft in order to simultaneously pick-up one parcel and release another parcel.

The primary object of the invention is to provide a device capable of suspension from an aircraft to intercept a pick-up parcel attached to a pick-up loop and to simultaneously and automatically release a deposit parcel previously secured to the device by means of a releasable securing element automatically actuated to parcel releasing position by means of the pick-up loop attached to the pick-up parcel.

A further object of the invention is to provide a simple, inexpensive and automatically actuable aerial pick-up and release device for use in the simultaneous pick-up of one parcel and deposit of another parcel by an aircraft, whereby the exchange of parcels may be accomplished in only a single pass of the aircraft over a special pick-up station on the ground or on any supporting structure over which the aircraft may fly.

Another object of the invention is to provide an improved automatic aerial pick-up and release device to extend the usefulness and scope of aircraft of the cargo carrying type.

The above and other objects of the invention will become apparent upon reading the following detailed description in conjunction with the drawing, in which:

Fig. 1 is a schematic perspective view of a parcel delivery aircraft approaching a parcel pick-up and deposit station.

Fig. 1a is a perspective view of the upper end of one post as used at the parcel pick-up and delivery station.

Fig. 2 is a side elevation view of the present aerial pick-up and release device showing the device at the moment of parcel exchange.

Fig. 3 is a side elevation view of the present aerial pick-up and release device showing the device ready for use but without any parcel lines attached thereto.

Reference is first made to Fig. 1 for a general explanation of the use and mode of operation of the present aerial pickup and release device. Here is shown an airplane 1 flying in over a pick-up and deposit station 2. The airplane is provided on its underside with a small hatchway or door from which is suspended a load carrying line or cable 3 having the aerial pick-up and release device 4 at the lower end thereof. The device 4 carries a deposit parcel 5 thereon and also has a stabilizing sleeve 6 secured to one side by a line 6' in such relation to the pick-up device as to cause a pick-up hook on the device to be presented toward the parcel pick-up loop 7 at the pick-up station 2. The loop 7 of rope or flexible cable carries a pick-up parcel 8 at one point thereon. The pick-up station 2 comprises a pair of spaced apart vertical posts or standards 9 each having a pair of pins 10 on the top end surface thereof, (see Fig. 1a). The parcel pick-up loop 7 is installed at the station 2 by draping the line forming the loop between the pairs of pins 10 with the parcel 8 about midway of the lower or hanging portion of the loop and with the remainder or upper portion of the loop pulled as tightly as possible between the posts 9. As the load carrying line 3 reaches the upper portion of the loop 7, the hook of the pick-up device 4 may be readily caught under the upper portion of the loop 7 to thereby lift the loop and the attached parcel 8 off the posts 9. The hook is provided with a limited degree of movement on the pick-up device 4 and the weight of the loop 7 and parcel 8 is thus adapted to move the hook, which movement causes simultaneous releasing movement of a releasable retaining means for the deposit parcel 5. Therefore the pick-up parcel 8 is intercepted and retained by the device 4 at the same time the deposit parcel is dropped at the station 2. The load carrying line 3 may then be reeled into the airplane 1 for removal of the pick-up parcel 8. This system eliminates the need for making two passes over a station for accomplishing exchange of parcels and also eliminates the necessity of separate pick-up and deposit devices. The system lends itself very well to the expeditious handling of mail, supplies and miscellaneous packages. In an emergency it could even be used in refueling an airplane by repeated pick-up of full gasoline cans and deposit of empty cans. This would enable the airplane to extend its effective range when flying over country where landing fields can not be successfully constructed.

Referring now to Figs. 2 and 3 the preferred construction of the present pick-up and release device will be described. The device 4 comprises a main body 11 tapering toward the upper end and having a longitudinal passage 12 therethrough to receive the load carrying line 3. About midway of one side of the body 11 there is provided a transverse pin 13 to retain a clevis member 14 having a line 6' secured thereto. This line 6' extends to a fabric sleeve 6, the drag effect of which causes the opposite side portion of the body 11 to be always directed ahead as the airplane flys through the air (see Fig. 1). At the lower end of the longitudinal passage 12 and concentric with respect thereto is a short sleeve 15 screw threaded into the body 11 at the upper end of the sleeve and screw threaded into a nut or collar member 16 at the lower end. A cotter pin 17 may be used to retain the nut member on the sleeve 15 in addition. The line 3 passes downwardly through the sleeve 15 and nut member 16 and terminates in a knot 18 seating in a shallow recess 19 in the underside of the nut member.

Slidably mounted on the sleeve 15 is a hook member 20 including the upper and outward projection 21 which serves to snag the parcel pick-up line or loop 7. The lower side of the member 20 is provided with an annular recess 22 concentric with respect to the sleeve 15 and facing a similar recess 23 in the upper side of the nut member 16. A compression spring 24 seated in the recesses 22 and 23 surrounds the sleeve 15 and tends to hold the hook member 20 in the uppermost position (see Fig. 3).

At the side of the hook member 20 opposite to that from which the projection or hook portion 21 extends, the member carries an upwardly extending rod or slide bolt 25 which may be screw threaded into the hook member as shown in Fig. 3. The rod 25 extends into and is slidably guided by a bore 26 in the body member 11, this arrangement serving to prevent relative rotation of the hook member 20 about the sleeve 15. In its normal projected position the rod 25 extends across the recess 27 in the body member 11 directly below the clevis member 14. The upper end of the rod 25 extends into a recess or socket 28' at the upper side of the recess 27. This will help to prevent bending of the bolt 25 under the weight of the deposit parcel 5 attached to the line 5'. The recess 27, adapted to receive a ring or loop 28 connected to the deposit parcel, is preferably slanted downwardly toward its outer end so that the ring 28 will more readily drop free when the bolt 25 is retracted, as in Fig. 2.

In view of the previous description of the mode of operation with reference to Fig. 1 of the drawing it will be apparent how the pick-up and release device 4 functions to achieve its purpose. The device 4 having the cable 3 attached thereto and having the deposit parcel 5 retained on the pick-up and release device by the ring 28 and line 5' is lowered from a flying aircraft through a suitable hatchway in the underside of the aircraft. Then the aircraft is manipulated or guided in such a manner as to cause the cable 3 to intercept or engage the pick-up parcel loop 7 just above the device 4. Since the hook portion 21 will always be extended forwardly, the pick-up loop 7 is immediately snagged by the hook portion. As the loop 7 and pick-up parcel 8 are lifted by the hook member 20, the latter member is retracted because of the weight of the parcel 8 (see Fig. 2). Retraction of the hook member 20 against the force of compression coil spring 24 also retracts the slide bolt 25 to a position where it no longer closes the outer end of the recess 27. This action releases the ring 28 and permits the deposit parcel 5 to fall to the ground. As the aircraft flies on the cable 3 is reeled into the aircraft taking the device 4 and the pick-up parcel along with it. The device 4 may then be prepared for another parcel exchange at another station or at the same station if desired. The simple line retaining pins 10 as shown in Fig. 1a are only shown by way of example and it is to be understood that numerous other types of clips, snaps or spring arm retainers may be used to releasably retain the pick-up loop 7 in position on the upper ends of the spaced apart posts 9.

The embodiment of the invention herein shown and described is to be regarded as illustrative only and it is to be understood that the invention is susceptible of variations, modifications and changes within the scope of the appended claims.

I claim:

1. An aerial pick-up and release device comprising, a body member having a body portion and a guide portion on the lower end thereof, and a lengthwise passage extending through the body portion and the guide portion of the body member for passing a load-carrying line or cable therethrough, an abutment member on the free end of the guide portion, a hook member slidably mounted for limited up-and-down movement on said guide portion between said abutment member and the body portion, said hook member including a hook portion projecting from one side of said body member, a compression coil spring on said guide portion between said abutment member and said hook member, means providing a recess in said body member at the side thereof opposite to that from which said hook portion extends, an upwardly extending bore in said body portion parallel to said guide portion and crossing the mouth of said recess, and an upstanding extension means rigidly connected to said hook member and slidable in said bore restraining rotational movement of said hook member and adapted to close the mouth of said recess when said hook member is in a projected position adjacent to the body portion and to open the mouth of said recess when said hook member is in the retracted position, whereby interception of a pick-up parcel line by said hook portion moves said hook member from its normally biased resting projected position to the retracted position which simultaneously moves said upstanding extension on said hook member to open the mouth of said recess for releasing a deposit parcel line.

2. An aerial pick-up and release device comprising, a body member having a lengthwise normally-vetrical passage therethrough, a tubular guide member rigidly secured on the lower end of said body member concentrically of said passage, a collar on the free end of said tubular guide member, said passage being adapted to receive a load carrying line passing also through said tubular guide and said collar with an enlargement on the lower end of the line abutting said collar, a hook member slidably mounted for limited up-and-down movement on said tubular guide member between said collar and said body member and including a hook portion projecting from one side thereof and extending away from one side of said body member, a compression coil spring on said tubular guide member between said collar and said hook member, means providing a downwardly sloping recess in said body member at the side opposite to that from which said hook portion extends, said body member having a cylindrical bore extending upwardly and parallel to said guide member across the mouth of said downwardly sloping recess, a short rod rigidly attached to said hook member and extending parallel and upwardly in slidable relation in said cylindrical bore to restrain said hook member from rotational movement and to close the mouth of said downwardly sloping recess when said hook member is in its normally biased resting projecting position adjacent to said body member for retaining the securing end of a deposit parcel line in said recess, and said rod being adapted to open the mouth of said downwardly sloping recess when said hook member is in the retracted position overcoming the bias of said compression spring, whereby interception of a pick-up parcel line by said hook portion moves said hook member to a retracted position and simultaneously moves said rod to a deposit parcel line releasing position in which it no longer extends across the mouth end of said recess and thus allows a deposit parcel line to drop from said recess.

LE ROY S. JESSEN.

REFERENCES CITED

The following references are of record in the file of this patent:

UNITED STATES PATENTS

| Number | Name | Date |
|---|---|---|
| 1,856,848 | Haybeck | May 3, 1932 |
| 1,873,822 | Castro | Aug. 23, 1932 |
| 1,873,917 | Ashley | Aug. 23, 1932 |
| 2,250,153 | Cooper | July 22, 1941 |
| 2,282,921 | Adams | May 12, 1942 |
| 2,487,798 | Griesinger et al. | Nov. 15, 1949 |